(12) United States Patent
Diao et al.

(10) Patent No.: US 8,196,114 B2
(45) Date of Patent: Jun. 5, 2012

(54) SYSTEM AND METHOD FOR SERVICE OFFERING FOR FEEDBACK CONTROLLER DESIGN AND IMPLEMENTATION FOR PERFORMANCE MANAGEMENT IN INFORMATION TECHNOLOGY SYSTEMS

(75) Inventors: Yixin Diao, White Plains, NY (US); Joseph Hellerstein, Seattle, WA (US); Sujay S. Parekh, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1418 days.

(21) Appl. No.: 11/750,388

(22) Filed: May 18, 2007

(65) Prior Publication Data

US 2008/0288266 A1 Nov. 20, 2008

(51) Int. Cl.
G06F 9/44 (2006.01)
G06F 15/18 (2006.01)
(52) U.S. Cl. ............ 717/128; 717/120; 717/127; 706/1; 706/12
(58) Field of Classification Search ................... None
See application file for complete search history.

(56) References Cited

U.S. PATENT DOCUMENTS

| | | | | |
|---|---|---|---|---|
| 7,266,804 B2* | 9/2007 | Hogg et al. | | 717/101 |
| 7,698,236 B2* | 4/2010 | Cox et al. | | 706/12 |
| 7,827,125 B1* | 11/2010 | Rennison | | 706/14 |
| 7,853,538 B2* | 12/2010 | Hildebrand | | 706/1 |
| 7,954,090 B1* | 5/2011 | Qureshi et al. | | 717/127 |
| 7,996,814 B1* | 8/2011 | Qureshi et al. | | 717/120 |
| 2004/0194065 A1* | 9/2004 | McGrath et al. | | 717/124 |
| 2009/0037885 A1* | 2/2009 | Edwards et al. | | 717/128 |
| 2009/0228871 A1* | 9/2009 | Edwards et al. | | 717/128 |

OTHER PUBLICATIONS

Boukezzoula et al., Fuzzy Feedback Linearizing Controller and its Equivalence With The Fuzzy Nonlinear Internal Model Control Structure, 2007, pp. 233-248, <http://matwbn.icm.edu.pl/ksiazki/amc/amc17/amc1729.pdf>.*
L. Burgstahler K. Dolzer, et al, "Beyond Technology: The Missing Pieces of QoS Success"; Proceedings of the ACM Sigcomm 2003 Workshops; Aug. 25 & 27, 2003.
J.K. Kok, et al., "PowerMatcher: Multiagent Control in the Electricity Infrastructure"; AAMAS'05 Jul. 25-29, 2005.

* cited by examiner

*Primary Examiner* — Thuy Dao
(74) *Attorney, Agent, or Firm* — Cantor Colburn LLP; Louis Percello

(57) ABSTRACT

A software development service offering of constructing and embedding feedback control based algorithms into computer systems management software applications is delivered by a provider entity to a client organization. The provider is contracted by the client to prepare a set of control modeling assets based on identified computing system management problems and goals of the diem and to create a set of control solutions. Bi-directional links between the problems, assets and solutions are used by the provider to develop feedback control based algorithms that solve the identified client computing management problems and meet the client's computing system goals.

6 Claims, 2 Drawing Sheets

SYSTEM AND METHOD FOR SERVICE OFFERING FOR FEEDBACK CONTROLLER DESIGN AND IMPLEMENTATION FOR PERFORMANCE MANAGEMENT IN INFORMATION TECHNOLOGY SYSTEMS

TECHNICAL FIELD

The present invention relates generally to computer systems management software services and application solutions. More particularly, the present invention relates to efficiently providing design and implementation services for incorporating feedback control methods into information technology (IT) solutions.

BACKGROUND

Feedback-based control methods effectively manage computing systems software services and application solutions. Including computer network applications. However, control theory, statistical modeling and complex analysis skills in addition, to separate research skills required for developing such methods are generally out of the normal scope of typical in-house IT development organizations' activities; thus, IT development organizations typically require outside help.

An IT development organization desiring to construct and embed computer systems management software solutions involving control theory techniques has two choices: either train their developers or hire outside help. Both are expensive and risky. For large IT organizations, it may be feasible to have an internal team specialized with such skills, and assigned on a short-term basis to each project to fill this need. However, even for the large organizations, the internal team must have methods and techniques to help them be productive and efficient between projects.

Therefore, the need exists for a method and system to assist IT development organizations in efficiently constructing and embedding computer systems management software solutions, while minimizing the time and costs for development and training, by working with an outsourcing vendor or team that will provide computer systems management software solutions.

In addition, the need exists for a method and system, used by the development team that combines automated control theory statistical modeling and complex analysis capabilities with automated research capabilities in a single, comprehensive computer systems software performance management development tool.

SUMMARY OF THE INVENTION

A method and system are disclosed herein for a computer systems management development tool that provides to a client user from a provider user, a software development service offering of constructing and embedding feedback control based algorithms into client user computer systems management software applications, where feedback control based algorithms are based on control theory, statistical modeling and complex analysis combined with extensive research capabilities and are used to compute values assigned to actuators according to system, performance objectives and metrics. A feedback control based, algorithm is expressed in the following mathematical equation: $u(k+1)=f(x(k), u(k))$, where k denotes time, u is the value of the actuator, x denotes the "state" of the system and/denotes the mathematical function for computing a new value for u. It is also possible to express cases where multiple actuators must be set and multiple metrics are used to perform the computation of the values for actuators. The method is stored in the form of a computer program on computer executable media. The computer program when executed by a computer allows for data input by at least the provider and/or the client for identifying client computing problems, preparing control modeling assets, creating control solutions, storing control problems, control modeling assets and control solutions and finalizing and delivering the feedback, control design solution.

Creating a set of control modeling assets based on identified client computing problems includes performing a first set of sub operations comprising six sub-operations; negotiating contract terms between the provider and client for designing and delivering a software development solution that constructs and embeds feedback control based algorithms into the client's computer systems management software applications; outputting a contract by the provider and/or the client; collecting information technology metadata by prompting the provider and/or the client to input such technology metadata required for feedback control based algorithm design, where the information technology metadata includes one or more of actuators, knobs, key performance indicator metrics, sensors and workload generators for collecting workload information, test information and production system information: designing data collections programs for identifying mathematical relationships required for collecting performance data for the feedback control based algorithms; collecting raw data to derive client system performance data; and determining system performance limits, where the provider builds preliminary system models to analytically obtain theoretical and practical limits on the behavior of feedback control based algorithms in the context of the client solution. These sob operations can be repeated as many times as necessary to complete the control modeling assets preparing operation.

Creating a set of control solutions based on the identified client computing problems includes performing a second set of sub operations comprising live sub-operations: negotiating feedback control based algorithms performance objectives using system performance limits insight from the provider and revising the contract to include these system performance objectives; designing feedback control based algorithms, where the provider user system carries out the main task of constructing feedback control, based algorithms that conform to the negotiated objectives by searching the control repository for existing control modeling assets and control solutions for a given management problem using knowledge base operations including fuzzy matching (in addition, neural logic operations can also be used) to leverage new solutions for current computer systems management problems by developing lessons learned, from previously created bi-directional links between the set of client side computer systems management problems, the control modeling assets and the control solutions; implementing feedback control based algorithms, based on designed information; evaluating the feedback control based algorithms performance, based on test system information. These sub operations can be repeated as many times as necessary to complete the control solutions creating operation.

Finalizing the feedback control based algorithms design includes performing a third set of sub operations comprising three sub operations: receiving by the provider from the client approval that the feedback control based algorithms design project is complete; providing final deliverables to the client; creating a new set of bi-directional, links between the set of client user computer systems management problems, the control modeling assets and the control solutions; and closing out the feedback control based algorithms design and implementation, project. This new set of bi-directional links is added to previously saved sets of bi-directional links and other data stored n the control repository and is used to develop solutions for client user computer systems management solutions in a next design project. These sub operations can be repeated as many times as necessary to complete the finalize design operation.

DETAILED DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein:

DETAILED DESCRIPTION

An exemplary embodiment of a computer systems software development service offering method and system is described in detail below. The disclosed exemplary embodiment is intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote a limitation of quantity, but rather denote the presence of one or more of the referenced item.

Figure 1:
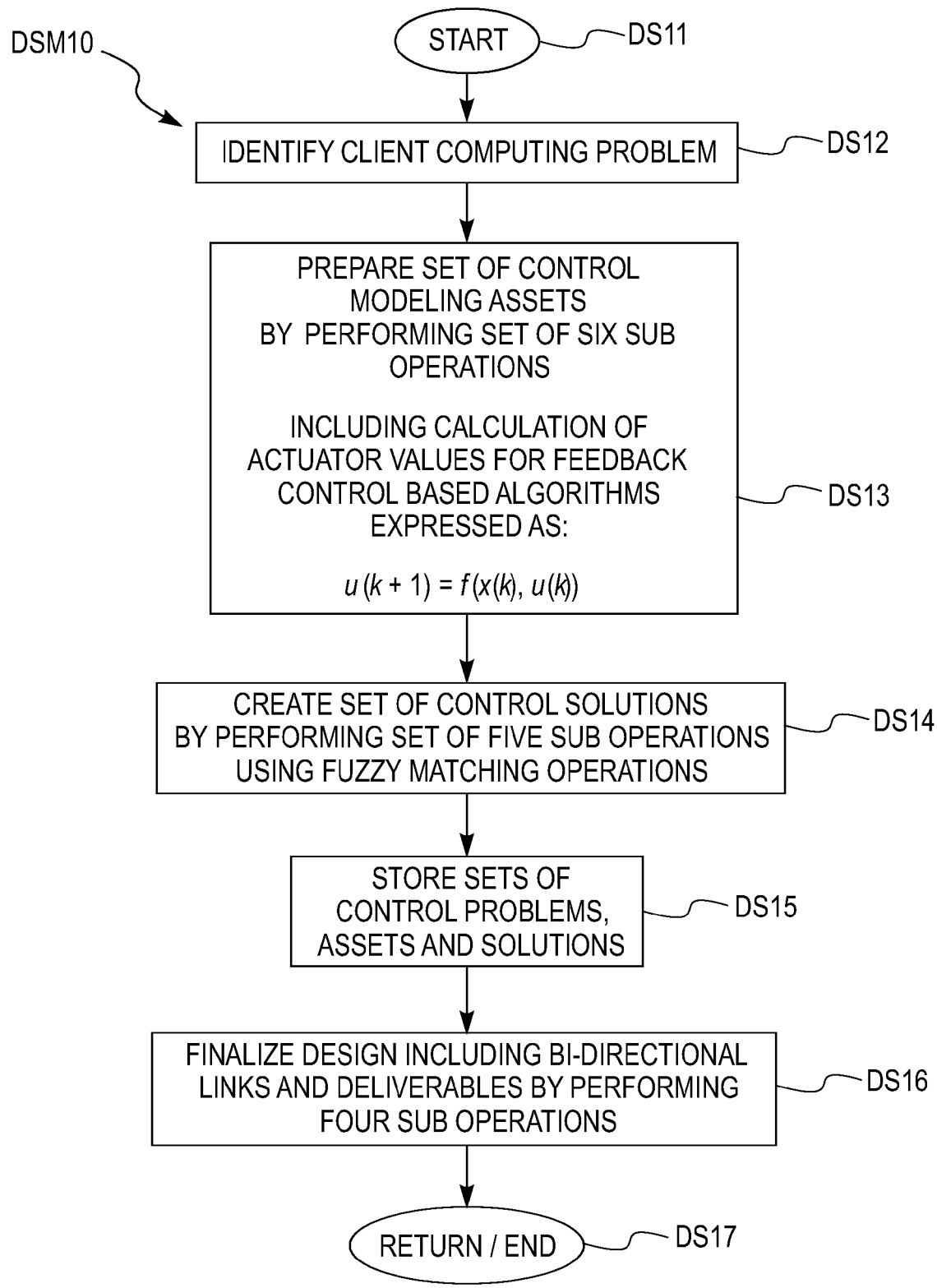
FIG. 1 illustrates a procedure for carrying out the operations of constructing and embedding feedback control based algorithms into computer systems management software applications over the client network.
Figure 2:
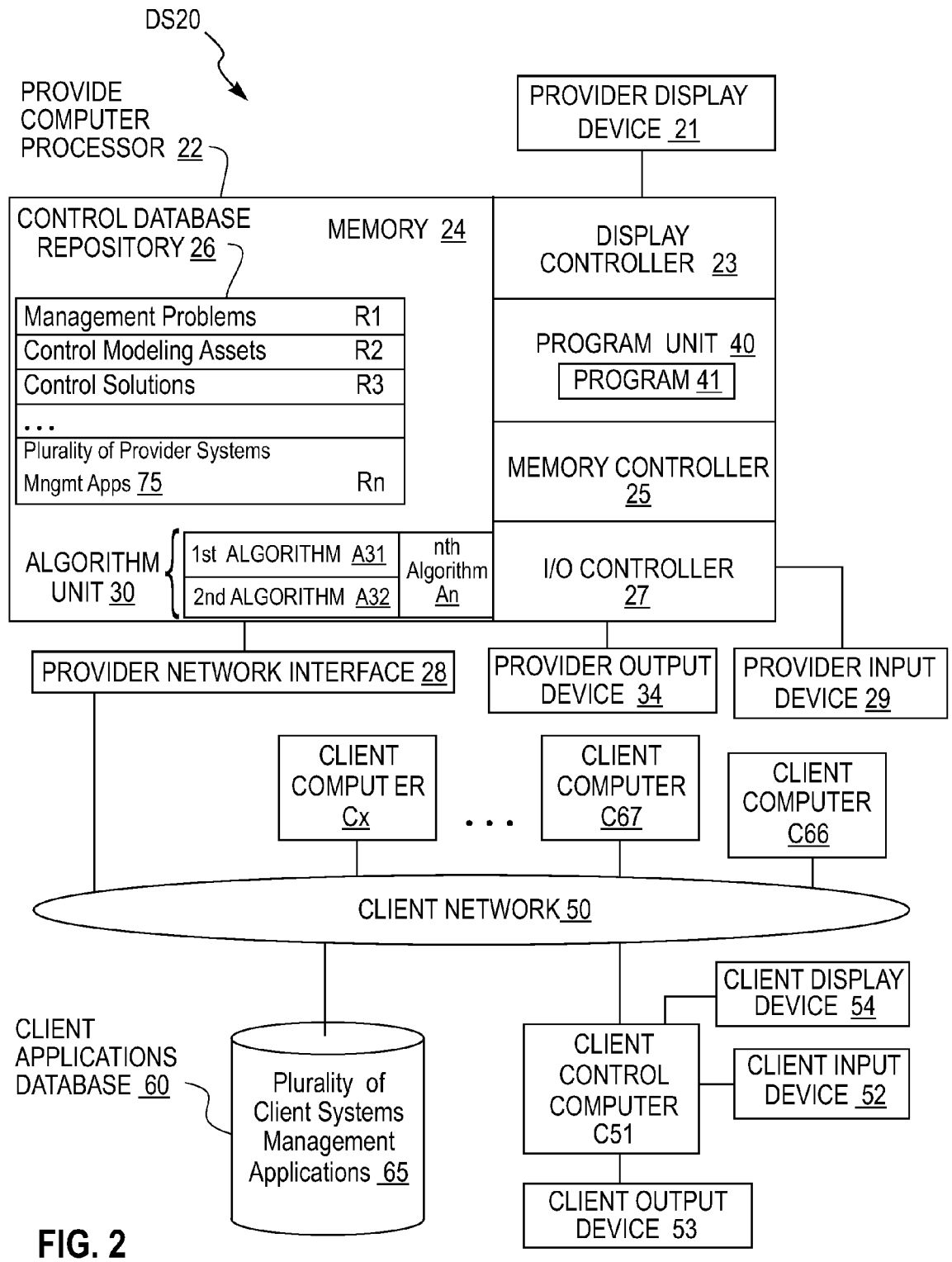
FIG. 2 illustrates a computer systems software development service offering system implementing the computer systems software development service offering method illustrated in FIG. 1.

Compute systems software development service offering method DSM10 and system DSS20 (referred to herein as ("method DSM10") and ("system DSS20")) are illustrated m FIG. 1 and FIG. 2 respectively. Referring to FIG. 1, method DSM10 describes the exemplary operation of providing, to a client user of the system from a provider user of the system, a software development service offering of constructing and embedding feedback control based algorithms into client user computer systems management software applications in the form of a software application package that makes up a comprehensive computer systems software performance management development tool. FIG. 2, illustrates the system DSS20 implementing method DSM10. Thus, the exemplary embodiment will be understood by referring to FIGS. 1 and 2.

Referring to FIG. 2, system DSS20 includes provider computer processor 22 having display controller 23, program unit 40, memory controller 25, input-output controller 27 (herein referred to as "I/O controller 27"), algorithm unit 30 and memory 24. Algorithm unit 30 contains a plurality of algorithms including a first algorithm A31, a second algorithm A32 up to an "A to the nth" algorithm (An) (i.e., third, fourth, fifth, etc. algorithms up to an infinite number of algorithms). Control repository 26 resides in memory 24. Control repository 26 contains a plurality of repository entry locations R1 through Rn. Thus, Control repository 26 holds the information about problems that have already been solved, about systems the provider user has encountered before, about systems that both the provider user and client user are familiar with, about known control algorithms and about what solutions have been applied to other systems software management problems before, that the provider user can learn lessons from and apply those lessons to current and prospective unsolved computer systems management problems. Control repository 26 is the virtual representation of a repository for the provider user knowledge base; however, physically, control repository 26 can be implemented in all known forms of memory devices and storage devices including hard drives and can be set up in storage appliances all over the world. Thus, the representation of control repository 26 illustrated in FIG. 2 coincides with the verbal representation of control repository 26 described above.

In an object-oriented approach, control repository 26 stores, in the plurality of repository entry locations R1 through Rn, each data item of a data model constructed to represent each object representing the class structure (i.e., the knowledge representation of the class structure) that supports application program interface (API) fuzzy matching queries.

Client applications database 60 is connected to client network 50 and contains a plurality of client systems management applications 65. Provider input device 29 is connected to I/O controller 27. Client applications database 60, client control computer C51, a plurality of client computers, i.e., client computer C66, client computer C67 through client computer Cx and provider network interface 28 are connected to client network 50. Each client systems management application of the plurality of client systems management applications 65 is available for running on any of the plurality of client computers C66 and C67 through Cx and the plurality of client computers C66 and C67 through Cx can be accessed by provider computer processor 22 via provider network interface 28, depending on a degree of access the provider user receives from, the client user. In this case, client computer Cx theoretically represents an infinite number of client computers, where x equals infinity, limited only by known network physical and bandwidth capacities. Control repository 26 is accessed by provider computer processor 22 through memory controller 25. Provider input device 29 provides interaction with provider computer processor 22 by the provider user. Client control computer C51 includes client display device 54, client input device 52 and client output device 53, Client input device 52 provides interaction with provider computer processor 22 by the client user via client network 50.

Referring to FIGS. 1 and 2, the operation of method DSM10 commences at start operation DS11. The software development service offering is managed by the service offering provider on the client's computer network by a software development design team. Method DSM10 is stored as a computer program in program 41 on computer executable media in program unit 40 of provider computer processor 22. When program 41 is executed by provider computer processor 22, program 41 causes provider computer processor 22 to perform the following operations:

Referring to FIG. 1, after starting at start DS11, program 41 at operation DS12 identities client computing problems by requesting data and/or information by prompting both the client user via client display device 54 and the provider user via provider display device 21 for input of client network management problems. When a set of client systems management problems is identified by either the client and/or the provider, the set of identified computer systems management problems is input by either the client and/or the provider via client input device 52 and/or provider input device 29 respectively.

At operation DS13, program 41 causes provider computer processor 22 to perform a set of six sub operations directed toward preparing and inputting of a set of control modeling assets, based on the set of client user computer systems management problems identified in operation DS12. The use of the set of control modeling assets will be described later in the discussion of method DSM 10. The set of six sub operations of DS13 are:

(DS13 Sub Operation 1) Program 41 prompts via client display device 54 and provider display device 21, in a first negotiating sub operation, for the negotiation of contract terms between the provider and the client. The contract terms include terms for designing and delivering by the provider to the client a software development service offering of constructing and embedding feedback control based algorithms into computer systems management software applications. The contract terms also include the degree of access the client allows the provider to have to the plurality of client systems management applications 65 and client computers C66, C67 through Cx operating on client network 50. The degree of access can be either no provider access, limited provider access or unlimited provider access. The contract terms also include a delivery schedule, a list of customer responsibilities and a fee schedule. Thus, contract terms are input through client input device 52 and/or provider input device 29 by the provider user and/or the client user respectively and stored in control repository 26 for later use in program 41 for designing feedback control based algorithms.

The negotiating further includes entering for use in program 41 by die provider user and/or the client user via provider input device 29 and/or client input device 52 respectively a first set of objectives, system details and target schedules of the client. If the contract terms are not acceptable to the client or the provider, then a second set of objectives; system details and target schedules from the client are negotiated. The negotiated second set of objectives, system details and target schedules are input through provider input device 29 and/or client Input device 52 and stored in program 41. The negotiating is repeated as many times as necessary to arrive at the number of objectives, details and schedules acceptable to both the provider and the client. The negotiated objectives, system details and target schedules are used as guideline terms for the provider of the software development service offering to construct and embed feedback control based algorithms into client user computer systems management software applications, by the provider user. The set of objectives must include some specific performance objectives, which usually take one of two forms: (a) regulation objective, where the value of one or more specific metrics must be maintained at a certain level or within a certain range or (b) service level optimization (SLO), where the target value of a metric is not known but instead the target value is desired to achieve an optimal condition. Examples of SLO limits can include minimum energy usage, maximum throughput and/or bandwidth.

(DS13 Sub Operation 2) Program 41 prompts via provider output device 34 and/or client output device 53 for acknowledgment that the negotiated contract terms are accepted by the provider and the client. After such acknowledgement is input via provider input device 29 and/or client input device 52, program 41 generates and outputs a contract by the provider to the client. This contract contains the negotiated contract terms and is signed by the provider and the client, where the negotiated contract terms include the responsibilities of the provider and the responsibilities of the client. The terms of the signed contract are input via provider input device 29 and/or client input device 52 and the terms are stored in control repository 26 for use by program 41.

(DS13 Sub Operation 3) Program 41 prompts for input of preliminary information technology metadata required for feedback control based algorithm design via provider display device 21 and/or client display device 54 in a first collecting sob operation. Either the provider and/or the client can input information technology metadata, This information technology metadata includes actuators, knobs, key performance indicator metrics, sensors or workload generators for collecting workload information, test information and production system information. As appropriate, the workload information includes web server HTTP, and/or, database server SQL requests and description, details. After the collection of information technology metadata, program 41 causes outputting of worksheets or solutions for collecting more detailed information system metadata via provider output device 34 and/or client output device 53. Program 41 calls an application program interface (API) algorithm to querying a repository and cause an additional prompting to request the provider and/or the client to input additional information technology metadata. The application program interlace conducts a query using fuzzy matching operations to produce exact results from imprecise data. In addition, knowledge representation of fuzzy logic can be augmented by the learning power of neural network operations including statistical estimators. With fuzzy matching an algorithm is designed to find documents containing terms related to the terms used in the query to conduct fuzzy searches. The application program interlace includes a query string of "find_solutions_with_system_element (systemElementName) or find_worksheets_for_system_element (system Element Name)." For example: find_worksheet_for_system_element("Apache") leads to the processes of searching a repository; identifying query worksheets used in environments with similar systems elements, extending existing worksheets or building new ones and outputting worksheets for collecting more detailed IT system metadata.

As seen above, control, repository 26 can store an object oriented data model representing the class structure that supports application program interlace fuzzy matching queries. Thus, the objected oriented data model represents a way of carrying out the invention by showing the hierarchy of connections and interrelationships of the object items stored in control repository 26. For example, a Control Solution Object contains API name strings; management problems; system metadata; data collection methodology; raw data; a solution architecture; and lessons learned. Subsequent objects representing each of these data items are represented by their own object/class and in turn are made up of data items, which branch out into other representations of objects/classes and their subsequent data items. As an example, objects/classes representing raw data; management problem; system metadata; solution architecture, each contains data items, where the raw data object contains data items of workload; control parameters; performance and integer identifier. Other objects/classes, which also have their own data items, include: system architecture; solution design patterns; pattern instantiation; design element; design mapping; system element; model mapping; controller mapping; data collection methodology; system model; controller (which is the object representing feedback control algorithms; data collection tool; parsing tool; system model template; control algorithm; parameter and model class.

(DS13 Sub Operation 4) Next, program 41 calls an algorithm used by the provider user of the provider user system to design, in a first designing sub operation, data collection programs or utilities or algorithms for identifying mathematical relationships between the target system actuators and knobs and for collecting performance data, for die feedback control based algorithms design process. An algorithm is called from algorithm unit 30 to assist the provider user by enabling the provider user to conduct an automated search of control repository 26 to select automatically, using fuzzy matching operations, data collection methods and create data collection tools based on information in the contract, the information system metadata and the past experience and knowledge of the provider gained from other development projects stored in control repository 26.

(DS13 Sub Operation 5) In another collecting sub operation, program 41 calls an algorithm to collect raw data to derive client system performance data. If the supporting data exists, then the algorithm identifies different system scenarios and then collects raw data based on the different scenarios. The data collection tools including workload generators are applied to collect such raw data that will enable system, modeling. Collecting raw data is carried out by either the provider user or the client user. The collecting operation can involve using a simulation model, a test, environment or a production environment.

(DS13 Sub Operation 6) Next, program 41 calls an algorithm to determine system performance limits, based on the identifying of client user computer systems computing problems and the preparation of the set of control modeling assets already conducted, which are stored in a control modeling assets repository, in this case repository entry location R2. In this determining sub operation, the algorithm called by program 41 builds preliminary system models to analytically obtain theoretical and practical limits on feedback control based algorithms performance, using mathematical formulas to express feedback control based algorithms performance objectives related to actuators and metrics, where feedback control based algorithms are based on control theory, statistical modeling and complex analysis and are used to compute values assigned to actuators according to the system performance objectives and metrics. The actuator values for a feedback control based algorithm is expressed in the following mathematical equation: $u(k+1)=f(x(k), u(k))$, where k denotes time, u is the value of the actuator, x denotes the "state" of the system and f denotes the mathematical function for computing a new value for u. It is also possible to express eases where multiple actuators must be set and multiple metrics are used to perform the computation of the values for actuators. If, necessary, program 41 can call any and/or all of the above algorithms/utilities to repeat any and/or all of the sub operations DS134 Sub operations 1-6 to complete the set of control modeling assets preparation operation.

At operation create set of control solutions DS14, program 41 causes provider computer processor 22 to perform six sub operations that create a set of control solutions, based on the set of client user computer systems management problems and the set of control modeling assets identified and prepared in operations DS12 and DS13 respectively. The set of control solutions will be stored in a control solutions repository, in this ease repository entry location R3. The five sub operations of DS14 are described as follows:

(DS14 Sub Operation 1) Program 41 calls an algorithm that prompts for the negotiation, by the provider user and client user, in a second negotiating sub operation for feedback control based algorithms performance goals. In this negotiation, program 41 uses client system performance limits insight to define concrete, realistic controller performance objectives for the client user, where these objectives become part of an enhanced, refined and revised contract. The revised contract includes revised target schedules for completion of the computer systems software development service offering. After the revisions to the contract are made by program 41, another algorithm is called by program 41 to prompt the provider user to develop, based on the experience and lessons learned by the provider team and based on the interactions between the provider design team and the client organization, definitive controller performance objectives. Thus, any feedback control based algorithms meeting the terms of the revised contract regarding feedback control based algorithms performance objectives are deemed suitable and useful products.

(DS14 Sub Operation 2) Program 41 calls an other algorithm used by a provider user of the provider user system to design in a second designing sub operation feedback control based algorithms. Based on prompts to the provider user from the other algorithm, the provider user is prompted to carry out the main task of constructing feedback control based algorithms that conform to the feedback control based algorithms objectives negotiated in the second negotiating operation. The provider user uses information from system metadata and information collected during system identification in conjunction with program 41 and the other algorithm to design multiple feedback control based algorithms. If, the design objectives have an incomplete specification, then the other algorithm assists the provider user by enabling an automated search of the control repository and automating the analysis, where based on previously created bi-directional links the search of the repository is conducted, using fuzzy matching to find control algorithm system models, to find control algorithm system model templates, to find solution architectures, to find solution architectures system elements, to search for previously applied control algorithms, based on control structure and to output controller, performance prediction and evaluation methods used to produce the useful, concrete and tangible result of completion of the design of feedback control based algorithms to address the client's computer systems management problems and cause the computer systems software to operate on the client network as negotiated in the client objectives.

(DS14 Sub Operation 3) Program 41 calls another algorithm to implement the designed feedback control based algorithms designed in the second designing sub operation discussed immediately above in sub operation (DS14 Sub Operation 2) by imbedding, via provider network interface 28, the designed feedback control based algorithms directly into client applications running on client computers C66, C67 through Cx connected to client network 50 or the newly designed feedback control based algorithms may be stored in client applications database 60, for embedding later into client software applications running on client computers C66, C67 through Cx. In designing these feedback control based algorithms, the provider user relies on as much information as possible from previously designed feedback control based algorithms' management problems, control modeling assets and control solutions data stored in control repository 26.

(DS14 Sub Operation 4) Program 41 calls another algorithm/utility to evaluate, in a first evaluating sub operation, feedback control based algorithms designed and constructed, based on the results of operations DS12, DS13 and DS14 already conducted. The provider user system creates and/or adapts already created feedback control based algorithms tools and methods to exercise and evaluate the designed feedback control based algorithms. The evaluating is conducted by the provider and/or the client, depending on the provider access level to the client network 50. The evaluating can occur at one or more analytical levels, simulation levels and real world levels with increasing degrees of fidelity and representativeness.

(DS14 Sub Operation 5) Program 41 calls another algorithm to evaluate in a second evaluating sub operation feedback control based algorithms design performance, based on test system information and repeat design and evaluation operations, if necessary. The provider user system creates and/or adapts existing (from either control repository 26 or provided by the client or available elsewhere) evaluation tools and methods to evaluate the feedback control based algorithms. The evaluating is conducted by the provider and/or the client, depending on the provider access to the client network 50. The evaluating can occur at one or more analytical levels, simulation levels and real world levels. The test system information includes information on one or more of infrastructure architecture, infrastructure description, hardware licenses, software licenses and workload drivers, where workload drivers include one or more of test eases and artificial workload generators with which the evaluation can be exercised. If, necessary, program 41 can call any and/or all of the above algorithms/utilities to repeat any and/or all of the sub operations DS14 Sub operations 1-5 to complete the set of control solutions creating operation.

The evaluation outcomes of operation DS14 are used for guiding further refinement of the feedback control based algorithms or for suggesting new approaches for feedback control based algorithms, which may be needed. Thus, as a result of operation DS14, a set of control solutions composed of feedback control algorithms are created by program 41, based on the results obtained in operations DS12-DS14.

At store operation DS15, program 41 stores the set of client user computer systems management problems, the set of control modeling assets and the set of control solutions in repository entry locations R1, R2 and R3 respectively of control repository 26. Thus, as illustrated in FIG. 2, the set of client user computer systems management problems are stored in Management Problems repository entry location R1; the set of control modeling assets are stored in Control Modeling Assets repository entry location. R2; and the set of control solutions are stored in Control Solutions repository R3.

When program 41 prompts, using provider display device 21 and/or client display device 54 in operation DS13, and searches for input of information and/or data, either the provider design team (i.e., the provider user) or the client user can provide the requested data and/or information via provider input device 29 and/or client input device 52 or the provider user system collects appropriate data by calling an algorithm or utility.

In the first collecting sub operation (DS13 Stub Operation 3), the first design sub operation (DS13 Sub Operation 4) and the second collecting sub operation (DS13 Sub Operation 5) of operation DS13 and in the first evaluating in sub operation (DS14 Sub Operation 4) and the second evaluating in sub operation (DS14 Sub Operation 5) of operation DS14, the mechanism for collecting information and for evaluating feedback control based algorithms design includes one or more of internal system function calls, application program interfaces utilizing fuzzy matching, operations, externally visible log files, standard interfaces (i.e., SNMP, CIM and WMI) or debugging interfaces.

The tools and methods used in the evaluating sub operations are prescribed on top of the data collection tools and methods and these evaluation tools and methods describe a feasible way to use the data collection tools and methods, based on the system architecture and hardware/software environment, in regard to how to create the scenarios under which the data collection must occur, and how to aggregate, organize and represent the resultant data.

To ensure a quality product, the feedback control based algorithms must be tested and their performance must be measured and evaluated. The evaluation tools enable these operations to be carried out. These evaluation tools can take several forms, either theoretical analysis, simulation and/or empirical. Theoretical evaluation tools operate on the abstract, mathematical forms of the system models and control algorithms.

Simulation evaluation tools allow more extensive evaluation of the controllers by capturing more details of the target system and/or workload. In this case, the evaluation tools can consist of: artificial workload generators, target system simulators and system output analyzers.

Empirical evaluation tools are used to study the feedback control based algorithm in real-world operation. Empirical tools often include workload generators and system output analyzers.

Often the same tools can be used for both simulation and empirical testing. The same workload generator tools used in data collection can be used in system evaluation as well, or new workloads may be created explicitly for evaluation purposes. System output analyzers are a key tool and they can generally indicate whether and how the control parameters must be adjusted or whether a new type of control algorithm must be used.

At finalize design operation DS16, program 41 finalizes the feedback control based algorithms design and implementation, by causing provider computer processor 22 to conduct the following three sub operations numbered (DS16 Sub Operation 1) through (DS16 Sub Operation 4) as follows:

At (DS16 Sub Operation 1) program 41 prompts the provider user and the client user to ensure that the provider user receives acknowledgment from the client user that the project is complete and approved by the client user;

At (DS16 Sub Operation 2), program 41 closes out the feedback control based algorithms design and implementation project, by embedding the set of feedback control based algorithms designed to address client systems management problems and by providing final deliverables to the client Including generating and outputting via client output device 53 additional technical support agreements and updates. It is often important to obtain qualitative evaluation from the client user. In this case, the evaluation tool will typically take the form of a survey, which can be conducted on line as well as via hardcopy.

At (DS16 Sub Operation 3), after the client user has approved the designed feedback control algorithms and the final deliverables have been delivered, program 41 calls another algorithm to create new bi-directional links between the set of client user computer systems management problems, the control modeling assets and the control solutions stored in control repository 26; in addition, the newly created bi-directional links are stored in control repository 26, then program 41 proceeds to return/end operation DS17 and ends. Thus, these newly created and stored bi-directional links, produce the useful, concrete and tangible result of adding to and enhancing the design capability of the computer systems software management offering service for future use by the provider, in a manner similar to the set of control modeling assets preparing operation and the set of control solutions creating operation, any and/or all of these sub operations in the finalize design operation can be repeated as many times as necessary to complete the finalize design operation. Upon completion of the finalize design operation, the provider can now refer to and use all of the lessons learned from past designs in future design applications that require constructing and embedding feedback control algorithms into computer systems software management applications.

While the disclosure has been described with reference to an exemplary embodiment, it will be understood by those skilled in the art that various changes may be made and equivalents may be substituted for elements thereof without departing from the scope of the disclosure, in addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A computer systems software development service offering method of constructing and embedding, using fuzzy matching operations by a provider user, feedback control based algorithms into computer systems management software applications operating on a network of a client user, the method, executed by a processor, comprising:

identifying by the provider user and the client user a set of client user computer systems management problems;

preparing a set of control modeling assets of the set of client user computer systems management problems by performing a first set of sub operations, performed by at least one of the provider user and the client user;

creating using fuzzy matching a set of control solutions based on the set of client user computer systems management problems by performing a second set of sub operations;

storing the set of client user computer systems management problems in a management problems repository entry location in a control repository, the set of control modeling assets in a control modeling assets repository entry location in the control repository and the set of control solutions in a control solutions repository entry location of the control repository; and finalizing feedback control based algorithms design, by performing a third set of sub operations of:

receiving, by the provider user from the client user, approval that feedback control based algorithms design is complete;

providing final deliverables of embedding a first set of feedback control based algorithms into computer systems management software applications operating on a client network, where the first set of feedback control based algorithms addresses the set of client user computer systems management problems and causes client user computer systems software to operate as defined by the client user on the client network, based on the set of control solutions, where feedback control based algorithms are based on control theory, statistical modeling and complex analysis and are used to compute values assigned to actuators according to system performance objectives and metrics and where actuator values for the first set of feedback control based algorithms are derived from a formula represented as $$u(k+1)=f(x(k), u(k))$$

where k denotes time, u represents actuator values, x denotes a state of a given system and f denotes a mathematical function for computing a new value for u; and creating a new set of bi-directional links between the set of client user computer systems management problems, the set of control modeling assets and the set of control solutions, where the new set of bi-directional links are saved in the control repository and added to the computer systems software development service offering method used by the provider user in a next design project of constructing and embedding a second set of feedback control based algorithms into computer systems management software applications.

2. The computer systems software development service offering method, according to claim 1, where the first set of sub operations comprises:

negotiating in a first negotiating operation a set of contract terms for constructing and embedding feedback control based algorithms into computer systems management software applications;

outputting in a first outputting sub operation a contract;

collecting in a first collecting sub operation information technology metadata using fuzzy matching queries by a first prompting of at least one of the provider user and the client user to input information technology metadata;

designing in a first designing sub operation data collection programs for identifying mathematical relationships between metadata actuators and knobs and for collecting performance data for feedback control based algorithms design, based on information in the contract, system metadata information and the past experience and knowledge gained from other systems, where the first designing sub operation includes conducting an automated search by the provider user of the control repository for existing control modeling assets and control solutions for a given management problem using fuzzy matching operations to leverage new solutions for current computer systems management problems by developing lessons learned from previously created bi-directional links between the set of client user computer systems management problems, the set of control modeling assets and the set of control solutions;

collecting in a second collecting sub operation a set of raw data; and determining in a determining sub operation client system performance limits using the set of raw data, where the provider user builds preliminary system models to analytically obtain theoretical and practical limits on feedback control based algorithms performance, where results of the first set of sub operations are used in the second set of sub operations, and where if necessary, repeating any of the first negotiating, the first outputting, the first collecting, the first designing, the second collecting, and the determining sub operations, to complete the first set of sub operations.

3. The computer systems software development service offering method, according to claim 2, where the second set of sub operations comprises:

negotiating in a second negotiating sub operation feedback control based algorithms system performance objectives, where the second negotiating further includes receiving by the provider user a first set of one or more objectives, system details and target schedules from the client user;

designing using fuzzy matching operations in a second designing sub operation feedback control based algorithms, where the provider user, carries out on a provider computer processor, constructing feedback control based algorithms that conform to feedback control based algorithms design objectives negotiated in the second negotiating sub operation, using information from system metadata and information collected during system identification, where the second designing sub operation includes conducting the automated search by the provider user of the control repository for existing control modeling assets and control solutions for the given management problem using fuzzy matching operations to develop lessons learned from previously created bi-directional links between the set of client user computer systems management problems, the set of control modeling assets and the set of control solutions;

implementing in an implementing sub operation feedback control based algorithms, based on information in the second designing sub operation;

evaluating in a first evaluating sub operation feedback control based algorithms design, based on test system information, where the provider user carries out on the provider computer processor one of creating and adapting feedback control based algorithms tools and methods to evaluate feedback control based algorithms, where outcomes of the first evaluating sub operation are used for one of guiding further refinement of feedback control based algorithms; and evaluating using fuzzy matching operations in a second evaluating sub operation feedback control based algorithms design performance, based on test system information, where the provider user performs, using the provider computer processor, one of creating and adapting feedback control based algorithms tools and methods to evaluate feedback control based algorithms, and where if necessary, repeating any of the second negotiating, the second designing, the implementing and the second evaluating sub operations, to complete the second set of sub operations.

4. A computer systems software development service offering system for constructing and embedding, by a provider user of the system, feedback control based algorithms into computer systems management software applications of a client user of the system, using fuzzy matching operations, the system comprising:

a provider computer processor containing a memory;

a display controller connected to the provider computer processor;

a provider display device connected to the display controller;

a memory controller connected to the provider computer processor;

an I/O controller connected to the provider computer processor, where a provider input device and a provider output device are connected to the I/O controller;

a provider network interface connected between the provider computer processor and a client network;

a client control computer connected to the client network, where the client control computer is connected to a client display device, a client input device and a client output device;

a client applications database, containing a plurality of client systems management applications, is connected to the client network;

a plurality of client computers connected to the client network, where each client computer in the plurality of client computers runs at least one systems management application of the plurality of client systems management applications;

a control repository residing in the memory of the provider computer processor, containing a plurality of repository entry locations;

a first repository entry location of the plurality of repository entry locations in the control repository residing in the memory of the provider computer processor storing management problems;

a second repository entry location of the plurality of repository entry locations in the control repository residing in the memory of the provider computer processor storing control modeling assets;

a third repository entry location of the plurality of repository entry locations in the control repository residing in the memory of the provider computer processor storing control solutions;

a program unit residing in the memory of the provider computer processor storing a computer program that when executed by the computer processor causes the provider computer processor to provide to the client user the computer systems software development service offering system constructing and embedding a first set of feedback control based algorithms into the client user computer systems' management software applications, where the first set of feedback control based algorithms are based on control theory, statistical modeling and complex analysis and are used to compute values assigned to actuators according to system performance objectives and metrics and where actuator values for the first set of feedback control based algorithms are derived from a formula represented as $$u(k+1)=f(x(k), u(k))$$

where k denotes time, u represents actuator values, x denotes a state of a given system and f denotes a mathematical function for computing a new value for u;

an algorithm unit residing in the memory of the provider computer processor stores a plurality of algorithms called by the program unit to carry out the providing to the client user the computer systems software development service offering system, where a first algorithm of the plurality of algorithms in the algorithm unit is called by the program unit to identify by one of the provider user and the client user a set of client user computer systems management problems;

a second algorithm of the plurality of algorithms is called by the program unit to prepare a set of control modeling assets for a set of computer systems management problems by performing a first set of sub operations performed by at least one of the provider user and the client user;

a third algorithm of the plurality of algorithms is called to create using fuzzy matching a set of control solutions based on the set of computer systems management problems by performing a second set of sub operations;

a fourth algorithm of the plurality of algorithms is called to store the set of client user computer systems management problems in a management problems repository entry location, the set of control modeling assets in a control modeling assets repository entry location and the set of control solutions in a control solutions repository entry location; and a fifth algorithm is called to finalize feedback control based algorithms design, by performing a third set of sub operations, where the third set of sub operations are performed by the provider user on the provider computer processor to:

receive, by the provider user from the client user, approval that feedback control based algorithms design is complete;

provide final deliverables of embedding the first set of feedback control based algorithms into computer systems management software applications operating on the client network where the first set of feedback control based algorithms addresses the set of client user computer systems management problems and cause client computer systems software to operate as defined by the client user on the client network, based on the set of control solutions; and create a set new of bi-directional links between the set of client user computer systems management problems, the set of control modeling assets and the set of control solutions, where the new set of bi-directional links are saved in the control repository and added to the computer systems software development service offering system used by the provider user in a next design project of constructing and embedding a second set of feedback control based algorithms into computer systems management software applications.

5. The computer systems software development service offering system, according to claim 4, where the second algorithm executes the first set of sub operations by prompting at least one of the provider user and the client user to:
- negotiate in a first negotiating operation a set of contract terms for constructing and embedding feedback control based algorithms into computer systems management software applications;
- output in a first outputting sub operation a contract;
- collect in a first collecting sub operation information technology metadata by using fuzzy matching operations queries by inputting information technology metadata;
- design in a first designing sub operation data collection programs for identifying mathematical relationships between metadata actuators and knobs and for collecting performance data for feedback control based algorithms design, based on information in the contract, system metadata information and the past experience and knowledge gained from other systems, where the first designing sub operation includes searching automatically the control repository for existing control modeling assets and control solutions for a given management problem using knowledge base operations including fuzzy matching operations to develop lessons learned from a previous set of bi-directional links between the set of client user computer systems management problems, the set of control modeling assets and the set of control solutions;
- collect in a second collecting sub operation a set of raw data; and
- determine in a determining sub operation client user system performance limits using the set of raw data, where the provider user builds preliminary system models to analytically obtain theoretical and practical limits on feedback control based algorithms performance, where results of the first set of sub operations are used in the second set of sub operations, and where if necessary, repeating any of the first negotiating, the first outputting, the first collecting, the first designing, the second collecting, and the determining sub operations, to complete the first set of sub operations.

6. The computer systems software development service offering system, according to claim 5, where the third algorithm executes the second set of sub operations, by prompting at least one of the provider user and the client user to:
- negotiate in a second negotiating sub operation feedback control based algorithms system performance objectives, where the second negotiating further includes receiving by the provider user in the provider computer processor a first set of one or more objectives, system details and target schedules from the client user;
- design using fuzzy matching operations in a second designing sub operation feedback control based algorithms, where the provider user, carries out in the provider computer processor, constructing feedback control based algorithms that conform to feedback control based algorithms objectives negotiated in the second negotiating sub operation, using information from system metadata and information collected during system identification, where the second designing sub operation includes searching automatically the control repository for existing control modeling assets and control solutions for a given management problem using fuzzy matching operations to develop lessons learned from the previous set of bi-directional links between the set of client user computer systems management problems, the set of control modeling assets and the set of control solutions;
- implement in an implementing sub operation feedback control based algorithms, based on information designed in the second designing sub operation;
- evaluate in a first evaluating sub operation feedback control based algorithms design, based on test system information, where the provider user, using the provider computer processor, performs one of creating and adapting feedback control based algorithms tools and methods to evaluate feedback control based algorithms, where outcomes of the first evaluating sub operation are used for one of guiding further refinement of feedback control based algorithms; and
- evaluate using fuzzy matching operations in a second evaluating sub operation feedback control based algorithms design performance, based on test system information, where the provider user performs one of creating and adapting feedback control based algorithms tools and methods to evaluate feedback control based algorithms, and where if necessary, repeating any of the second negotiating, the second designing, the implementing and the second evaluating sub operations, to complete the second set of sub operations.

* * * * *